United States Patent

Hui-Chen

[11] Patent Number: 6,058,975
[45] Date of Patent: May 9, 2000

[54] CONNECTION MEMBER OF WATER CONTROL VALVE

[76] Inventor: Chao Hui-Chen, 75, Liau Tsuo Hsiang, Liau Tsuo Li, Lu Kang Chen, Chang Hua Tsien, Taiwan

[21] Appl. No.: 09/383,612

[22] Filed: Aug. 26, 1999

[51] Int. Cl.[7] .................................................. F16K 11/10
[52] U.S. Cl. .......................... 137/883; 137/271; 137/884; 285/133.4; 285/125.1; 285/144.1
[58] Field of Search ..................................... 137/883, 884, 137/271; 285/321, 147.1, 144.1, 133.4, 125.1, 127.1, 901

[56] References Cited

U.S. PATENT DOCUMENTS

| | | | |
|---|---|---|---|
| 212,611 | 2/1879 | Linnell | 137/883 X |
| 1,366,591 | 1/1921 | Passano | 137/883 X |
| 2,598,961 | 6/1952 | Andrus | 137/883 |
| 3,538,940 | 11/1970 | Graham | 137/271 |
| 3,760,836 | 9/1973 | Albanese | 137/207 X |
| 3,788,344 | 1/1974 | Dyck | 137/271 |
| 3,831,983 | 8/1974 | Stickler | 285/133.4 |
| 4,141,384 | 2/1979 | Zijlstra | 137/883 |
| 4,662,656 | 5/1987 | Douglas et al. | 285/321 X |
| 4,823,835 | 4/1989 | Chu | 285/147.1 |
| 5,056,563 | 10/1991 | Glossop | 137/883 |
| 5,327,976 | 7/1994 | Hattori | 285/125.1 |
| 5,707,085 | 1/1998 | Kubiak | 285/321 X |
| 5,908,157 | 6/1999 | Antonellis et al. | 137/624.2 X |

Primary Examiner—Stephen M. Hepperle
Assistant Examiner—John Bastianelli
Attorney, Agent, or Firm—Harrison & Egbert

[57] ABSTRACT

A connection member is designed to connect a plurality of water control valves and is formed of a main body which is connected with a water main and is provided with two connection tubes for fastening a plurality of valve mounts in conjunction with a plurality of extension tubes. The water control valves are fastened with the valve mounts.

5 Claims, 5 Drawing Sheets

CONNECTION MEMBER OF WATER CONTROL VALVE

FIELD OF THE INVENTION

The present invention relates generally to a water control valve, and more particularly to a connection member of the water control valve.

BACKGROUND OF THE INVENTION

The sprinkler is widely used in the irrigation of various crops. In order to accommodate a plurality of sprinklers in a single area, a number of water distributing pipes must be set up, so as to provide the sprinklers with the irrigation water. The water distributing pipes must be, in turn, connected with the water main. It is extremely uneconomical to establish many irrigation pipes.

SUMMARY OF THE INVENTION

The primary objective of the present invention is to provide a connection member which can be connected with a plurality of water control valves. The water control valves can be angularly oriented. The connection member comprises a main body which is connected with a water main and is provided at both opposite ends thereof with a connection tube for fastening a valve mount for fastening a water control valve. Located between two valve mounts is an extension tube. A plurality of water control valves can be thus indirectly connected with the main body.

The features, functions, and advantages of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
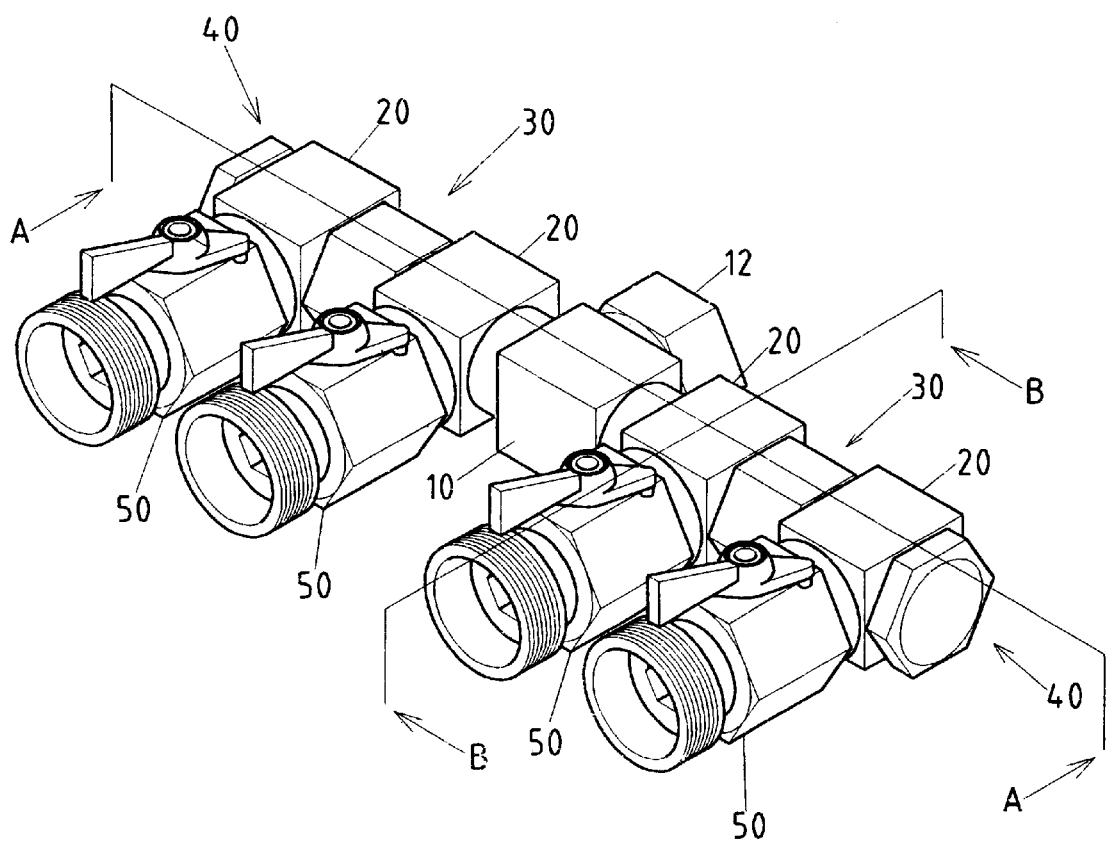
FIG. 1 shows a perspective view of the present invention.
Figure 2:
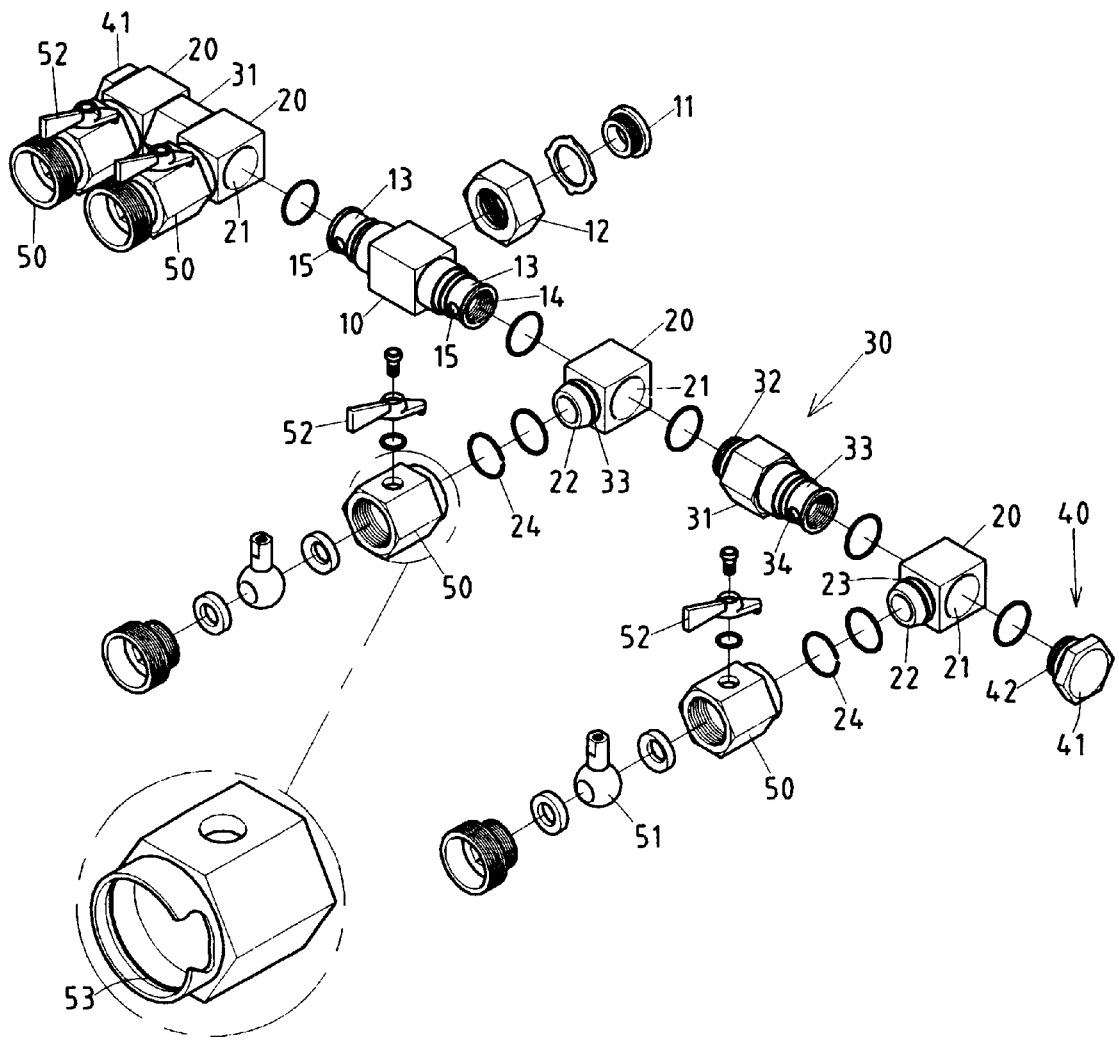
FIG. 2 shows an exploded view of the present invention.
Figure 3:
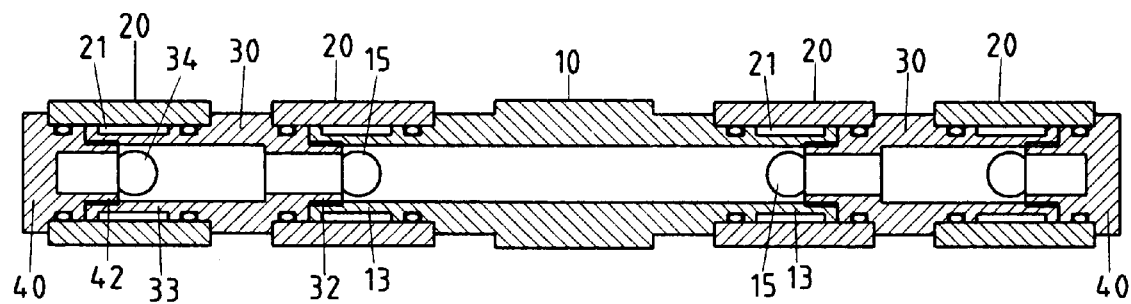
FIG. 3 shows a sectional view of a portion taken along the direction indicated by a line A—A as shown in FIG. 1.
Figure 4:
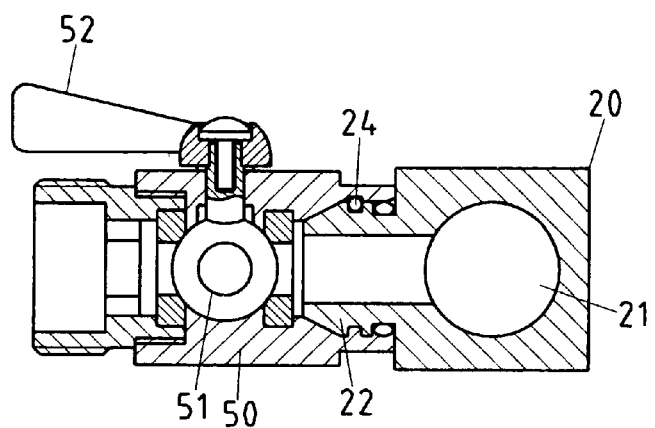
FIG. 4 shows a sectional view of a portion taken along the direction indicated by a line B—B as shown in FIG. 1.
Figure 5:
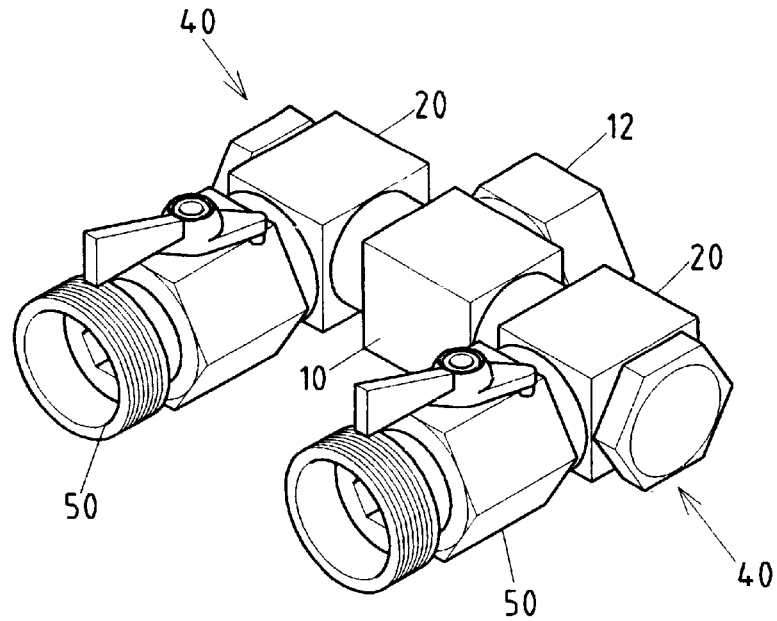
FIG. 5 shows a perspective view of the present invention having two water control valves.
Figure 6:
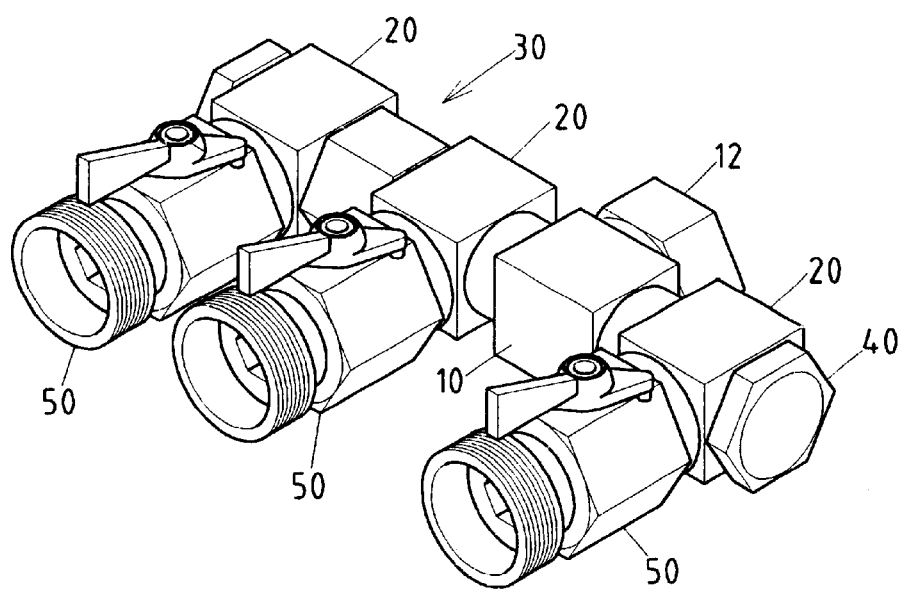
FIG. 6 shows a perspective view of the present invention having three water control valves.
Figure 7:
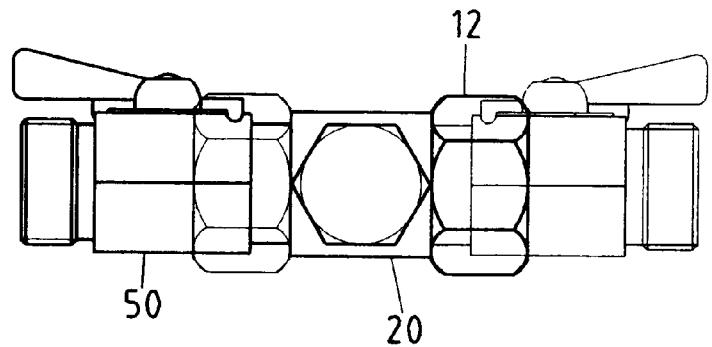
FIG. 7 is a schematic plan view showing the adjustment in orientation of the water control valve of the present invention.
Figure 8:
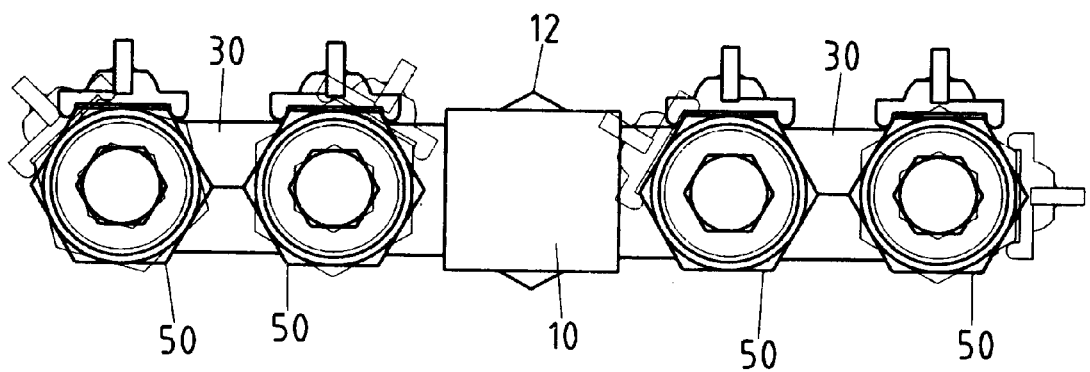
FIG. 8 is a schematic plan view showing the adjustment in angle of the water control valve of the present invention.

As shown in all drawings provided herewith, a connection member embodied in the present invention is designed to connect a plurality of water control valves 50, which are in turn, connected with a plurality of sprinklers (not shown in the drawings) by hoses (not shown in the drawings). The connection member comprises a main body 10, a plurality of valve mounts 20, a plurality of extension tubes 30, and a plurality of end caps 40.

The main body 10 is of a tubular construction and is provided at the center thereof with a fastening member 11 and a nut 12. The main body 10 comprises two connection tubes 13 opposite to each other and in communication with each other via a hollow interior of the main body 10. The connection tubes 13 are provided with two holes 15 opposite in location to each other, and in free ends thereof with inner threads 14.

The valve mounts 20 are provided with two end holes 21 opposite to each other, and an insertion tube 22 having an outer groove 23 for retaining an elastic C-ring 24. The insertion tube 22 is in communication with the end holes 21. The connection tubes 13 of the main body 10 are received in the end holes 21 of the valve mounts 20.

The extension tubes 30 comprise a polygonal portion 31 which is provided at one end thereof with an outer threaded portion 32 which is engaged with the inner threads 14 of the connection tube 13 of the main body 10, and at other end thereof with an inner threaded portion 33.

The end caps 40 are provided with an outer threaded portion 42 which is engaged with the inner threaded portion 33 of the extension tube 30. The outer threaded portion 42 of the end cap 40 is also engageable with the inner threads 14 of the connection tube 13 of the main body 10 via the end hole 21 of the valve mount 20.

Each of the water control valves 50 is provided therein with a spherical valve 51 which is controlled by a control rod 52. The water control valve 50 is provided in the inner wall of one end thereof with a circular groove 53 for retaining a 24. The water control valve 50 is fastened at other end thereof with the valve mount 20 such that the insertion tube 22 of the valve mount 20 is inserted into the interior of the water control valve 50.

It must be noted here that the main body 10 is connected with a water main (not shown in the drawing) by means of the nut 12 of the main body 10.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

I claim:

1. A connection member for connecting a plurality of water control valves, said connection member comprising:

a main body of a hollow tubular construction and provided with a nut for fastening said main body with a water main, said main body further provided with two connection tubes opposite to each other and in communication with a hollow interior of said main body whereby said connection tubes are provided at a free end thereof with inner threads;

a plurality of valve mounts, each having two end holes opposite to each other and in communication with each other, and an insertion tube provided with an outer groove for retaining an elastic C ring whereby said insertion tube is in communication with said end holes;

a plurality of extension tubes, each having a polygonal portion which is provided at one end thereof with an outer threaded portion, and at other end thereof with an inner threaded portion; and two end caps provided with an outer threaded portion which is engaged with said inner threaded portion of said extension tube.

2. The connection member as defined in claim 1, wherein said insertion tube of said valve mounts is received in the water control valve.

3. The connection member as defined in claim 1, wherein said outer threaded portion of one of said extension tubes is engageable with said inner threaded portion of other one of said extension tubes.

4. The connection member as defined in claim 1, wherein said outer threaded portion of said extension tubes is engageable with said inner threads of said connection tubes of said main body.

5. The connection member as defined in claim 1, wherein said outer threaded portion of said end caps is engageable with said inner threads of said connection tubes of said main body.

* * * * *